Dec. 24, 1946. H. I. GOULD 2,412,980
GARDEN AND LAWN RAKE
Filed July 29, 1944
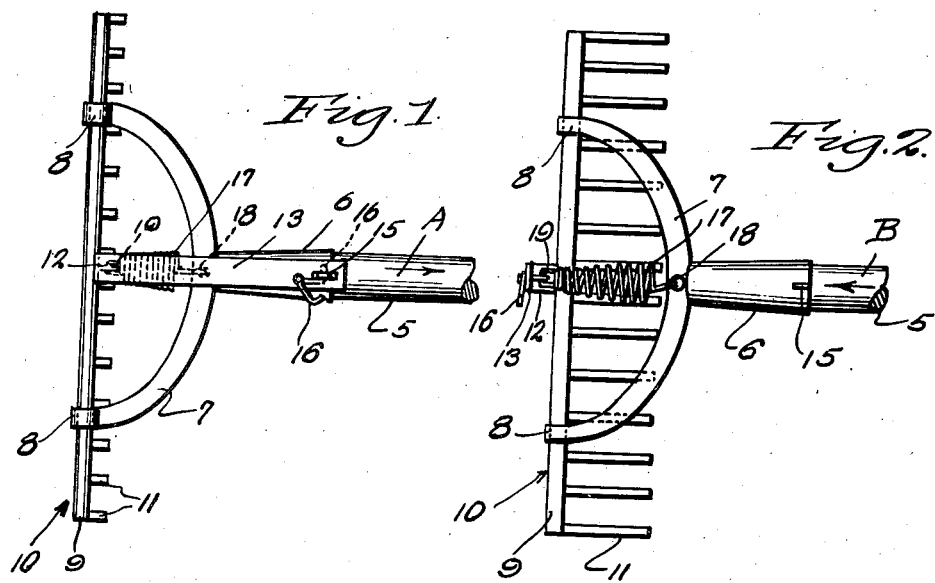
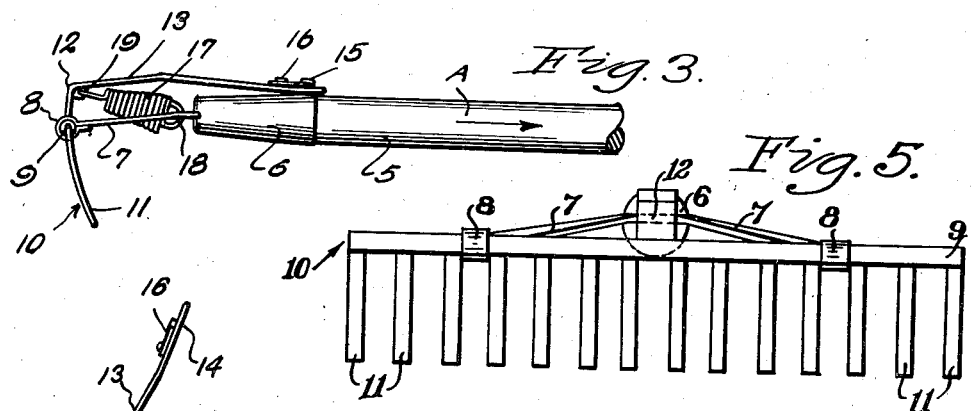
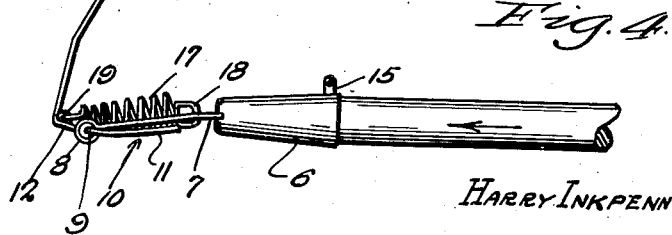
HARRY INKPENN GOULD, Inventor
By Clarence A. O'Brien
and Harvey B. Jacobson
Attorneys Patented Dec. 24, 1946

2,412,980

UNITED STATES PATENT OFFICE 2,412,980

GARDEN AND LAWN RAKE

Harry Inkpenn Gould, St. Louis, Mo., assignor of one-half to Adolph M. Krall, St. Louis, Mo.

Application July 29, 1944, Serial No. 547,139

2 Claims. (Cl. 56—400.20)

This invention relates to a novel and improved garden and lawn rake, that is, a rake having an especially constructed toothed head which normally occupies the regular right-angularly disposed position in respect to the longitudinal axis of the handle, but which is tiltable, at will, to permit it to fold and occupy a position substantially parallel with said handle, for dislodging and cleaning debris from the teeth, and other purposes.

Needless to say, I am aware that garden rakes have been provided with mechanical devices for stripping weeds and debris from the teeth for purposes of cleaning said teeth. In carrying out the principles of the instant invention, I have evolved and produced an arrangement wherein the rake head itself is so constructed and arranged in respect to the other parts that a mere folding or tilting operation is sufficient to accomplish the desired results, this with requisite expediency and certainty.

In reducing to practice the preferred embodiment of the invention I achieve the desired aims by providing the handle with an especially constructed yoke, the back of the rake being swingably mounted in bearings on the free ends of the arms of the yoke, and spring means being provided, along with a latch device, for automatically swinging and returning the rake head from a horizontal folded cleaning position to regular raking position.

In keeping with the ideas and principles of this invention it is believed that I have evolved and produced an unusually simple and efficient structure, the same being sturdy and reliable and otherwise aptly fitted to achieve the purposes and results desired.

Other features and advantages will become more readily apparent from the following description and the accompanying illustrative drawing.

In the drawing, wherein like numerals are employed to designate like parts throughout the same—

Figure 1 is a top plan view of a rake constructed in accordance with the structural and functional principles of the instant invention.

Figure 2 is a top plan view like Figure 1, but showing the rake per se folded beneath the handle and assuming a horizontal cleaning position.

Figure 3 is a side elevational view of the assemblage seen in Figure 1.

Figure 4 is a side elevational view of the assemblage and arrangement of parts depicted in Figure 2.

Figure 5 is a front end elevational view picturing the complete structure as seen in a direction from left to right in either of Figures 1 or 3.

Referring now to the drawing by distinguishing reference numerals, it will be seen that the handle, which is conventional, is denoted by the numeral 5. This is provided at the raking end with a ferrule 6, the ferrule having a substantially semi-circular yoke or adapter frame 7 formed integral therewith. The free ends of the arms of the yoke are fashioned into eyes 8 which constitute bearings and which receive the back bar 9 of the rake 10. The teeth, which are conventional or of any suitable construction, are denoted by the numeral 11. It is evident that the back bar 9 is rockably mounted in said bearings 8.

I next call attention to a substantially L-shaped attachment for the rake whose short limb 12 is rigidly connected to the intermediate portion of the bar 9. The longer limb 13 forms a reach element and has a keeper opening 14 formed in its free end portion which slips down over an apertured keeper lug 15 on the ferrule as shown better in Figure 4. A latching hook 16 is provided adjacent keeepr slot and this is adapted to swing through the aperture in the lug or keeper 15 as shown in dotted lines in Figure 1. By pressing the slot 14 down over the lug and then locking the latch 16 in place all of the parts of the structure are relatively rigid and the device is used as any ordinary rake. When the latch 16 is released from keeper 15, the limb 13 can then be unfastened and swung to the position as shown in Figure 4. This allows the user to exert a downward stress or pressure against the rake 10, whereby to fold it beneath the yoke against the tension of a coiled spring 17.

The coiled spring as shown in Figure 2, is anchored at one end as at 18 to the intermediate apertured portion of the yoke 7. The opposite end portion is secured as at 19 to the L-shaped adapter. The point of connection 19 is at the angular or juncture point between the limbs 12 and 13. Thus the spring is a return spring and normally tends to swing the rake head to its usual raking position shown in Figures 1 and 3.

Under ordinary circumstances, the latch hook 16 is fastened in the keeper 15 and the parts are as shown in Figures 1 and 3. The structure is then an ordinary rake and is pulled in the usual way in the direction of the arrow A as shown in Figures 1 and 3. Then, by releasing the latch hook and disengaging the limb 13 from the keeper lug 12, the rake head 10 is in a position to swing on the pivot provided by the bearings 8. By simply pressing down and exerting the proper stress against the teeth of the rake, said rake folds beneath and in a plane with the yoke. At this time the rake is shoved in the direction of the arrow B. It can thus be employed as a ways-and-means of dislodging weeds, grass and debris from the teeth as is obvious. It follows that I have evolved and produced a simple and expedient versatile and convertible rake construction which is an improvement in the art and effectively achieves the aims desired.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. A garden rake of the class described comprising a handle, a ferrule capped over the outer end of said handle, said ferrule being provided with substantially semi-circular integral yoke, the free ends of the arms of said yoke terminating in eyes, said eyes constituting bearings, an apertured keeper lug on the inner end portion of said ferrule, a rake head comprising a back bar and teeth, said back bar being mounted for oscillation in said bearings, a substantially L-shaped adapter member having its short arm connected integrally with the intermediate portion of the rake head, the long arm being adapted to swing over and in alignment with said ferrule, the free inner end of said long arm being provided with a keeper slot engageable with said lug, a latch hook pivoted on said free slotted end and engageable with the aperture in said lug, and a coiled spring, said spring being anchored at one end on the intermediate portion of said yoke, the opposite end of said spring being anchored on the short arm of L-shaped adapter.

2. A rake of the class described comprising a handle, a ferrule fitted over the outer end thereof, said ferrule being provided with an integral yoke, the free ends of the arms of said yoke being provided with eyes constituting bearings, a rake head comprising a back bar and teeth formed rigid therewith and extending at right angles therefrom, said back bar being hingedly mounted at longitudinally spaced points in said bearings, a coiled spring anchored at one end on the intermediate portion of said yoke and attached at its opposite end to the intermediate portion of said back bar, an L-shaped adapter having one end secured to said bar and the opposite end provided with a keeper slot, an apertured keeper lug on said ferrule projectable through and beyond said slot, and a hook pivoted on said adapter and releasably engageable with said keeper lug.

HARRY INKPENN GOULD.